No. 768,072. PATENTED AUG. 23, 1904.
H. S. PEASE.
FLUTING DEVICE.
APPLICATION FILED JUNE 25, 1903.
NO MODEL. 2 SHEETS—SHEET 1.
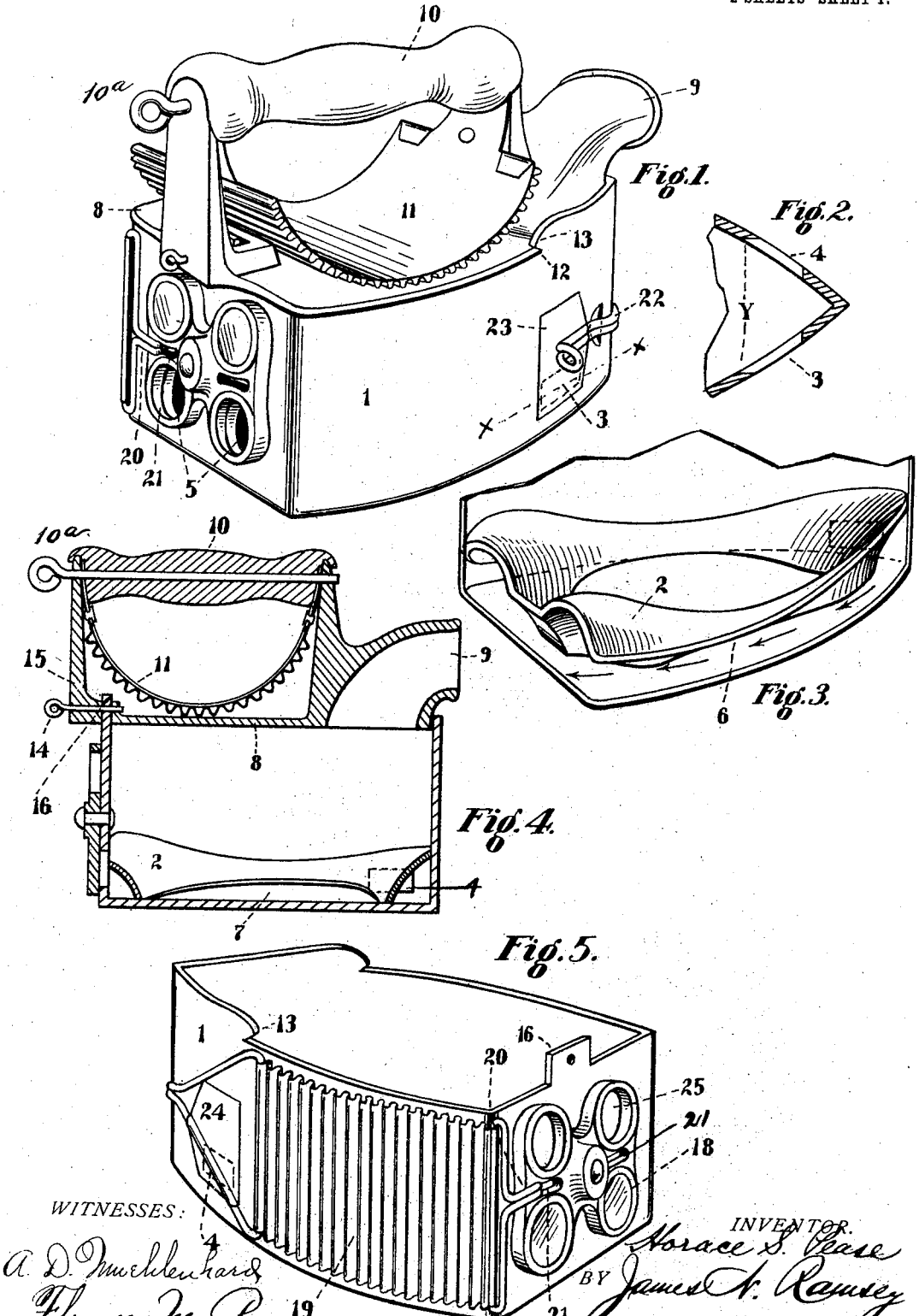
WITNESSES:
A. D. Muehlenhard
Florence M. Powri
INVENTOR.
Horace S. Pease
BY James N. Ramsey
ATTORNEY.

No. 768,072. PATENTED AUG. 23, 1904.
H. S. PEASE.
FLUTING DEVICE.
APPLICATION FILED JUNE 25, 1903.
NO MODEL. 2 SHEETS—SHEET 2.
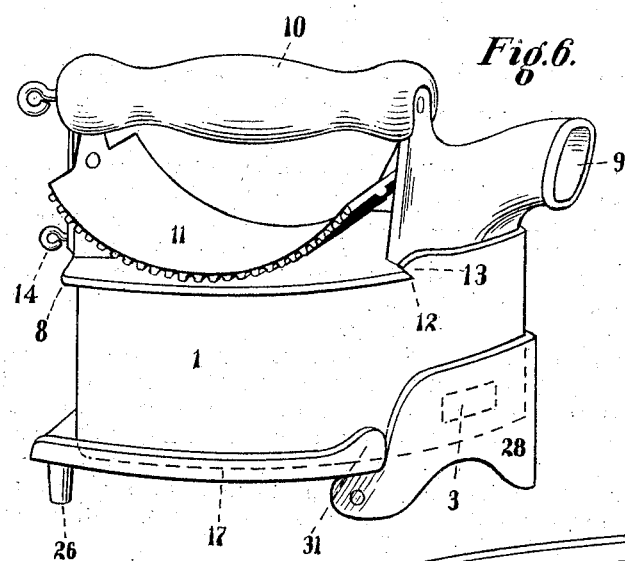
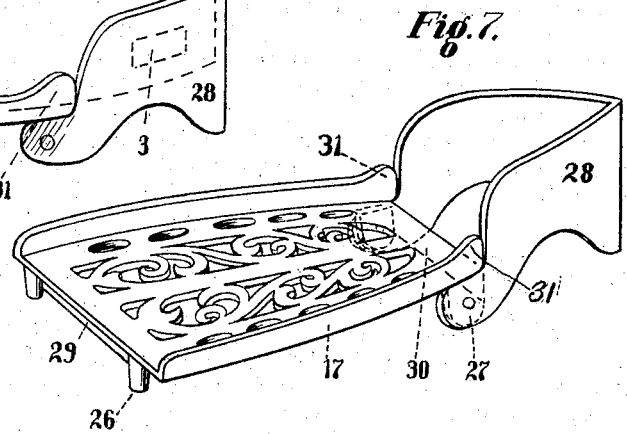
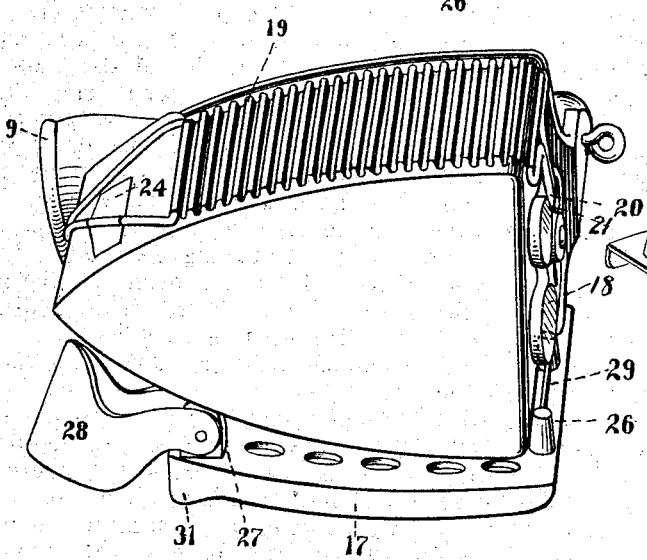
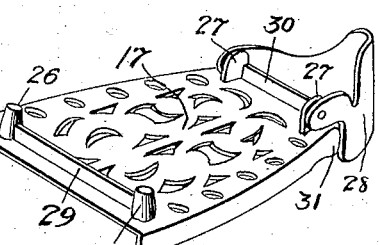
WITNESSES: INVENTOR.
Horace S. Pease
BY James N. Ramsey
ATTORNEY.

No. 768,072. Patented August 23, 1904.

UNITED STATES PATENT OFFICE.

HORACE S. PEASE, OF CINCINNATI, OHIO.

FLUTING DEVICE.

SPECIFICATION forming part of Letters Patent No. 768,072, dated August 23, 1904.

Application filed June 25, 1903. Serial No. 163,057. (No model.)

*To all whom it may concern:*

Be it known that I, HORACE S. PEASE, a citizen of the United States, residing at Cincinnati, in the county of Hamilton and State of Ohio, have invented certain new and useful Improvements in Fluting Devices, of which the following is a specification.

My invention relates to improvements in fluting devices.

The object of my invention is to produce a more convenient, simple, and inexpensive device of this kind.

My invention consists in the several novel parts and in the combination, arrangement, and details, as hereinafter more fully described, and as particularly pointed out in the claims.

In the drawings, Figure 1 is a perspective view of my device. Fig. 2 is a horizontal section of the front end of the same, taken through the front draft-openings on line $x\,x$ of Fig. 1. Fig. 3 is a perspective view of the interior of Fig. 1. Fig. 4 is a central vertical section of Fig. 1. Fig. 5 is a perspective view of the body of the device with the cover removed. Fig. 6 is a side view of my device. Fig. 7 is a perspective view of the stand-damper. Fig. 8 is a perspective view of the fluting device, including the damper-stand of Fig. 7 when inverted. Fig. 9 is a perspective view of the stand-damper inverted.

The body 1 is provided with a removable cover 8, having a flue 9 at one end thereof and handle 10, preferably carrying fluter-rocker 11, said cover being held in place at its forward end by catches 12 on the cover, engaging with lugs 13 on the body, and at the rear end by a pin 14, taking through standard 15 of the cover and lug 16 of the body. I have shown the handle removable because it also serves as the handle for the fluter-rocker 11, which must be removed when used in connection with the fluter 19. The handle 10 and fluter-rocker 11 are detachably secured together and to the cover by the removable rod 10ª.

The grate 2 is preferably formed with its outer edges flared upwardly to engage the inner walls of the body and form air-ducts 6 beneath the grate-bars extending from end to end upon each side of the body, said air-ducts communicating with the draft-openings 3 and 4 in the front end and 5 in the rear end. The rear draft-openings 5 are passages of any desired shape extending from the exterior to the interior of the body, as clearly shown in the drawings.

When preparing to use the device, remove the cover 8, put the fuel, preferably charcoal, inside the body 1, and replace the cover 8, having front and rear draft-openings unobstructed. This will cause a draft underneath the grate and through the fuel from end to end of the body as well as out of the flue 9.

To prevent the device from becoming overheated by too much draft when it is not in use, the draft-openings 3 and 4 should be closed by means of the stand-damper 17, as shown in Fig. 6, and the draft-openings 5 are also closed by the damper 18, turning the same to the position shown in Fig. 5.

When for any purpose it is desired to carry the device from one place to another to prevent too much draft or overheating, attach fluter-base 19 to the side of the body 1, as shown in Figs. 1 and 5, by engaging hook 20 in the eye 21 of the damper 18 and spring catch 22 over the forward end of the body. This will hold the damper 18 closed over openings 5, as shown in Fig. 5, and to open draft-openings 5 revolve the damper to the position shown in Fig. 1 and engage hook 20 in eye 21. Plates 23 and 24, formed of flat metal pieces secured to the fluter-base 19, will cover and close draft-openings 3 and 4.

The damper 18 is formed as shown in Fig. 5 and has upon one side apertures 25. This damper is pivoted at its center upon the outside of the rear end of the body and is adapted to revolve thereon to bring said apertures into registry with the draft-openings 5 or to close said draft-openings by turning the solid part of the damper into registry with said openings, as may be desired.

The stand-damper 17 is constructed with a body having a flat upper surface and upturned side flanges tapering at one end to conform to the shape of the body and to prevent it from sliding off.

The stand is supported by supports 26 at the rear end and supports 27 at the front end. The supports 27 are preferably formed flat, and I pivotally connect thereto a hood 28.

The hood 28 is preferably formed with V-shaped vertical walls each having at its end an ear adapted to be pivotally connected to the supports 27, while the lower V-point of the hood forms a foot upon which the hood rests when standing in an upright position. It is necessary that the hood 28 extend higher than the top of the stand in order to cover the draft-openings 3 and 4 of the body, and in order to use the same stand to support the body when fluting, as shown in Fig. 8, and prevent the front end of the fluter-rack from being too high the stand and hood are hinged so that when they are inverted the hood will move upon its pivots to permit both ends of the stand to rest upon the table, the hood adjusting itself upon its pivots out of the way to permit the body to rest upon supports 27 at its front end, the other end of the body being supported and held in secure position by engagement with the sides of supports 26.

When it is desired to use the device for fluting purposes, invert the stand shown in Fig. 7 to the position shown in Fig. 8 and place the body thereon, as shown in said figure. It will thus firmly rest and be securely held, the body engaging against the sides of the supports of the stand at its rear end and upon the ends of the supports at the front end. To adjust the device as a fluter upon the fluter-rack, turn the body upon one side with the fluter-base already in position upon the other side thereof, then engage the rear end of the body with the sides of supports 26, and lower the front end until it rests upon supports 27, as shown in Fig. 8. I also provide said fluter-rack with strengthening-ribs 29 and 30, rib 29 serving to engage the rear of the body if it should happen to shift out of engagement with either of the supports. I provide on the forward end of each flange a lug 31, so that the front of the body will be elevated to the proper position and the hood 28 held out of contact therewith during the operation of fluting.

An important advantage in having the plates upon the fluter-base 19 is that when the body is turned to the position shown in Fig. 8 the fuel and ashes are prevented from dropping out.

I claim—

1. In a fluting device, a stand, a V-shaped hood pivoted thereto and provided with a foot to hold it in an upright position, a fluter-body having a V-shaped end provided with draft-openings adapted to be closed by said V-shaped hood when said body is supported in an upright position upon the stand, a detachable fluter-base adapted to be clamped to the fluter-body, plates upon the frame of the detachable fluter-base adapted to close said draft-openings when the fluter-body is supported upon its side, and means for holding the stand in horizontal and inclined positions.

2. In a fluting device, a fluter-body, a flat base having supports upon one side adapted to hold it in a horizontal plane, and supports upon its opposite side adapted to hold it in an inclined plane, a hood pivoted to one end of said base and adapted to stand in a vertical plane when the base is supported in a horizontal plane and adapted to be swung out of a vertical plane to permit the base to be adjusted to the proper inclined plane for supporting the fluter-body during the operation of fluting and at the same time not interfere therewith.

3. In a fluting device, a fluter-body, a stand having a flat base with supports adapted to hold said base in a horizontal plane for supporting said fluter-body in an upright position, and supports upon its opposite side for holding said base in an inclined plane for supporting the fluter-body when turned upon its side for fluting, and a V-shaped hood pivoted to the stand and provided with a foot to hold it in a vertical position when the base is in a horizontal plane and adapted to be swung out of said position and out of interference with the fluter-body to give the proper incline to the base for supporting the body for fluting.

4. In a fluting device, a fluter-body, a fluter-base mounted thereon, a stand having a base provided with supports extending laterally from each side thereof, a hood pivoted to one end of said stand and adapted to close the draft-openings of the fluter-body when standing in an upright position, and to be swung out of interference therewith and permit the stand to be adjusted to the proper inclined plane to support the body for fluting.

5. In a fluting device, a stand having side flanges and a pivoted end hood to engage and hold a fluter-body in an upright position, and supports and rib to engage and hold the fluter-body in a sidewise position for fluting, all substantially as and for the purposes set forth.

6. In a fluting device, a stand having a pivoted hood adapted to engage the fluter-body when in upright position, and supports to engage and hold said body in a sidewise position for fluting, substantially as set forth.

HORACE S. PEASE.

Witnesses:
JAMES N. RAMSEY,
AMELIA D. MUEHLENHARD.